(12) United States Patent
Tian

(10) Patent No.: US 6,290,401 B1
(45) Date of Patent: Sep. 18, 2001

(54) AUTOMATED CHIP/PHASER HOLDER

(75) Inventor: Yong Tian, Dammarie les Lys (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/299,767

(22) Filed: Apr. 26, 1999

(51) Int. Cl.[7] .................................................. G02B 6/36
(52) U.S. Cl. .............................. 385/88; 385/89; 385/90; 385/91; 385/49; 385/52
(58) Field of Search ................... 385/88, 89, 90, 385/91, 92, 93, 94, 49, 52

(56) References Cited

U.S. PATENT DOCUMENTS

| | | | |
|---|---|---|---|
| 4,041,294 | 8/1977 | Inoyama et al. | 235/151.11 |
| 4,433,898 | * 2/1984 | Nasiri | 350/96.17 |
| 5,071,215 | 12/1991 | Hockaday | 385/49 |
| 5,214,726 | 5/1993 | Hockaday | 385/14 |
| 5,222,170 | * 6/1993 | Bargar et al. | 385/88 |
| 5,251,266 | 10/1993 | Spigarelli et al. | 382/8 |
| 5,745,624 | * 4/1998 | Chan et al. | 385/91 |
| 5,926,594 | * 7/1999 | Song et al. | 385/49 |

* cited by examiner

Primary Examiner—Frank G. Font
Assistant Examiner—Roy M. Punnoose
(74) Attorney, Agent, or Firm—Daniel P. Malley; Eric M. Smith

(57) ABSTRACT

An automated optical chip holder for use in a pigtailing system precisely positions an optical chip at a predetermined location in three-dimensional space to align the optical chip within the pigtailing system. An adjustable chuck assembly is driven by a stepper motor under PLC control to position optical chip. After alignment, the optical chip is clamped by the adjustable chuck assembly during the pigtailing process to prevent the optical chip from moving out of alignment. This significantly reduces the occurrence of glue-joint failure and misalignment due to retraction stress. The clamp is fabricated using soft resilient materials at the point of contact with the chip. Thus, uniform pressure is exerted on the chip, micro-vibrations are absorbed, damage to the chip is reduced, and the necessity of precision motion control of the chuck assembly is avoided. The design of the automated chip holder allows the optical chip to be loaded and the pigtailed chip to be automatically unloaded using minimal operator involvement. The automated chip holder also accomodates different sized optical chips without altering the size of the chuck assembly holding the device.

17 Claims, 6 Drawing Sheets

AUTOMATED CHIP/PHASER HOLDER

BACKGROUND OF THE INVENTION

1. Field of the Invention

The present invention relates generally to an optical chip holder in a pigtailing system, and particularly to an automated optical chip holder that loads the optical chip and unloads the pigtailed optical chip in an automated mass-pigtailing system.

2. Technical Background

Optical fibers must be precisely and securely aligned with integrated optical chip waveguides during a pigtailing procedure. Otherwise, light signals propagating through the resulting device will be severely degraded by attenuation and other optical losses. In addition, processes depending on the extensive use of manpower, are undesirable. From an efficiency standpoint, it is most desirable that the entire pigtailing process for loading the optical chip, precision aligning, pigtailing, and unloading be automated and reproducible.

One approach that has been considered involves the use of vacuum chucks. Typically, the optical chip is placed on a chuck platform surface having air ducts which communicate to a plenum. Subsequently, the air in the plenum is evacuated and the resulting vacuum force holds the optical chip against the platform surface. However, this approach has several drawbacks. First, vacuum chucks tend to produce air fluctuations that induce small vibrations, perturbing the optical chip. Thus, the stability of the optical chip is not maintained during the curing of the glue. More importantly, retraction stresses during the curing of the glue cause the optical chip's waveguides to be misaligned with the fiber or fiber array block. As a result, the device has a lower reliability and the resulting optical losses are high. Another drawback associated with this method is the dependency on skilled labor. An operator is required to load the optical chip and unload the pigtailed optical chip manually. Since this is a very delicate operation, the success of the pigtailing process is largely dependent on the experience of the operator.

In another approach that has been considered, a slide mechanism is used to hold the optical chip in place. The face of the optical chip substrate is used as a support reference. The slide mechanism slides against the substrate face to clamp it against a support. Although the stability of the optical device is improved, the resulting chip thickness dispersion tends to negatively affect the reproducibility of the process. Like the method described above, this method requires that an operator load the optical chip and unload the pigtailed optical chip manually. Again, since this is a very delicate operation and the success of the pigtailing process is dependent on the experience of the operator.

Thus, a need exists for an automated chip holder that precisely, securely, and repeatedly positions and aligns optical chips within the pigtailing system. Further, a need exists for an automated chip holder that automatically loads the optical chip and unload the pigtailed optical chip with minimal operator involvement; one that is suitable for mass-producing pigtailed optical devices.

SUMMARY OF THE INVENTION

The present invention addresses the problems of the conventional systems discussed above. The automated chip holder of the present invention automatically loads and precisely positions the optical chip at a predetermined position. The chip is clamped in position for pigtailing using soft resilient materials that secure the chip in two dimensions. The resilient clamp materials compensate for irregularities in the hard surfaces of the chuck platform causing the pressure that is exerted on the chip to be more uniformly distributed. Thus, micro-vibrations are substantially reduced and damage to the chip is avoided, resulting in improved manufacturing yields. In addition, the resiliency of the clamp materials will compensate for relatively coarse positional adjustments of the chuck assembly during positioning and alignment. After pigtailing, the pigtailed chip is automatically unloaded with minimal operator involvement. The chip holder accomodates optical chips having various shapes and sizes.

One aspect of the present invention is an automated chip holder for positioning an optical chip in a pigtailing system. The optical chip has a registration edge and a registration surface. The automated chip holder positions the optical chip in a three dimensional space characterized by a rectangular coordinate system having an x-axis, y-axis, and z-axis. The automated chip holder includes: a support base having a slide track disposed parallel to the x-axis; a registration member fixed to the support base for defining an alignment position in the three dimensional space; an adjustable chuck assembly slidably disposed on the slide track for moving the optical device between a device interchange position and the alignment position, the adjustable chuck assembly being movable in the x-axis direction and adjustable in the z-axis direction in response to a force directed in the x-axis direction; and a drive unit connected to the adjustable chuck assembly for applying the x-axis force to said adjustable chuck assembly.

In another aspect, the present invention includes a method for positioning an optical device in a pigtailing system using an automated chip holder. The optical device includes a registration edge and a registration surface. The automated chip holder includes a support base having a slide track, a registration member fixed to the support base for defining an alignment position in a three dimensional space characterized by a rectangular coordinate system having an x-axis, y-axis, and z-axis. The method for positioning comprising the steps of: providing an adjustable chuck assembly slidably disposed on the slide track for moving the optical device between a device interchange position and the alignment position, the adjustable chuck assembly being movable in the x-axis direction and adjustable in the z-axis direction in response to an x-axis force; and applying the x-axis force to thereby move the optical device from a device interchange position to the alignment position.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
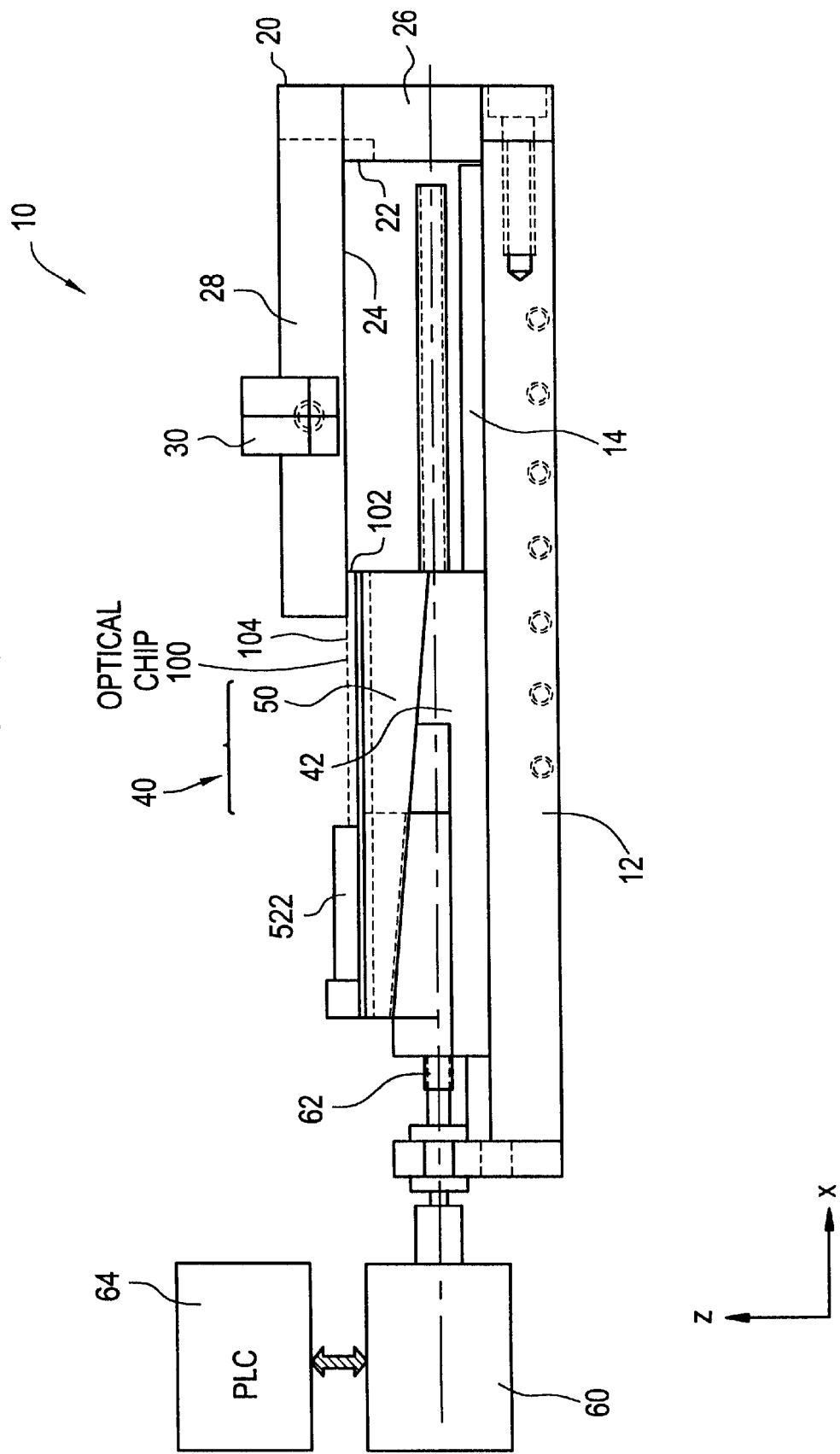
FIG. 1 is a side elevation view of the automated chip holder of the present invention.

Reference will now be made in detail to the present preferred embodiment of the invention, an example of which is illustrated in the accompanying drawings. Wherever possible, the same reference numbers will be used throughout the drawings to refer to the same or like parts. An exemplary embodiment of the automated chip holder of the present invention is shown in FIG. 1, and is designated generally throughout by reference numeral 10.

In accordance with the invention, the present invention for an automated chip holder 10 includes an adjustable chuck assembly 40 which moves optical chip 100 to a precise location in three dimensional space. Optical chip 100 is disposed on a resilient pad and adjacent to a resilient wedge to protect the chip from damage during clamping. The resilient material applies uniform clamping forces acting in a horizontal and vertical direction during the pigtailing process. This is an important feature that absorbs microvibrations, eliminating chip misalignment due to retraction stresses. There are other advantages associated with using the resilient materials. The incremental movements of the clamp need not be as precise as a clamp having a hard non-resilient surface. If a non-resilient clamp exerts too much force on the chip, it will damage the chip. Thus, the motion control system must be implemented using stricter tolerances to avoid such damage. On the other hand, the resilient material is forgiving and accomodates a chuck assembly having coarser incremental movements when clamping. Thus, the necessity of precision motion control is avoided along with the concomitant cost. Note also, that the resilient wedge is interchangeable allowing the adjustable chuck assembly 40 to accomodate optical chips having various sizes and shapes.

As discussed above, automated chip holder 10 positions optical chip 100 at a precise location in three-dimensional space. Movement in the three dimensional space is described throughout in reference to a Cartesian coordinate system having mutually orthogonal x, y, and z axes. The length of automated chip holder 10 corresponds to an x-axis, the width corresponds to a y-axis, and the height corresponds to a z-axis.

As embodied herein, and depicted in FIG. 1, automated chip holder 10 includes a support base 12 which functions as a chassis for automated chip holder 10. Support base 12 includes slide track 14, which is a raised portion used for guiding adjustable chuck assembly 40 in either direction along the x-axis. Registration member 20 is connected to support base 12 and defines the alignment position of optical chip 100 in three-dimensional space. Adjustable chuck assembly 40 is slidably disposed on support base 12 and carries optical chip 100 between a device interchange position and the alignment position. Adjustable chuck assembly 40 includes a transport member 42 which is movable along the x-axis, and adjustable platform 50 which adjusts the position of optical chip 100 along the z-axis. The device interchange position and the alignment position will be discussed in more detail below. Rotatable screw 62 is connected to adjustable chuck assembly 40. Rotatable screw 62 drives adjustable chuck assembly 40 in either direction along the x-axis using screw transfer motion. Stepper motor 60 is connected to rotatable screw 62 and is reversible, rotating in either a clockwise or counter-clockwise direction as needed. Programmable Logic Controller (PLC) 64 is connected to stepper motor 62. The operational sequence of automated holder 10 resides in PLC 64.

In accordance with the invention, the registration member 20 may further include column member 26, which is fixed to support base 12 and extends in a direction parallel to the z-axis. Column member 26 is connected to cantilevered member 28 and is parallel to support base 12. Adjustable stop member 30 is disposed on cantilevered member 28 spaced apart from column member 26. The spacing is variable to accomodate various chip sizes. Surface region 24 of cantilevered member 28 located in the space between stop member 30 and column member 26 is the z-axis alignment reference corresponding to the registration surface 104. Column surface 22 provides an x-axis alignment reference for aligning registration edge 102 of optical chip 100.

Figure 2:
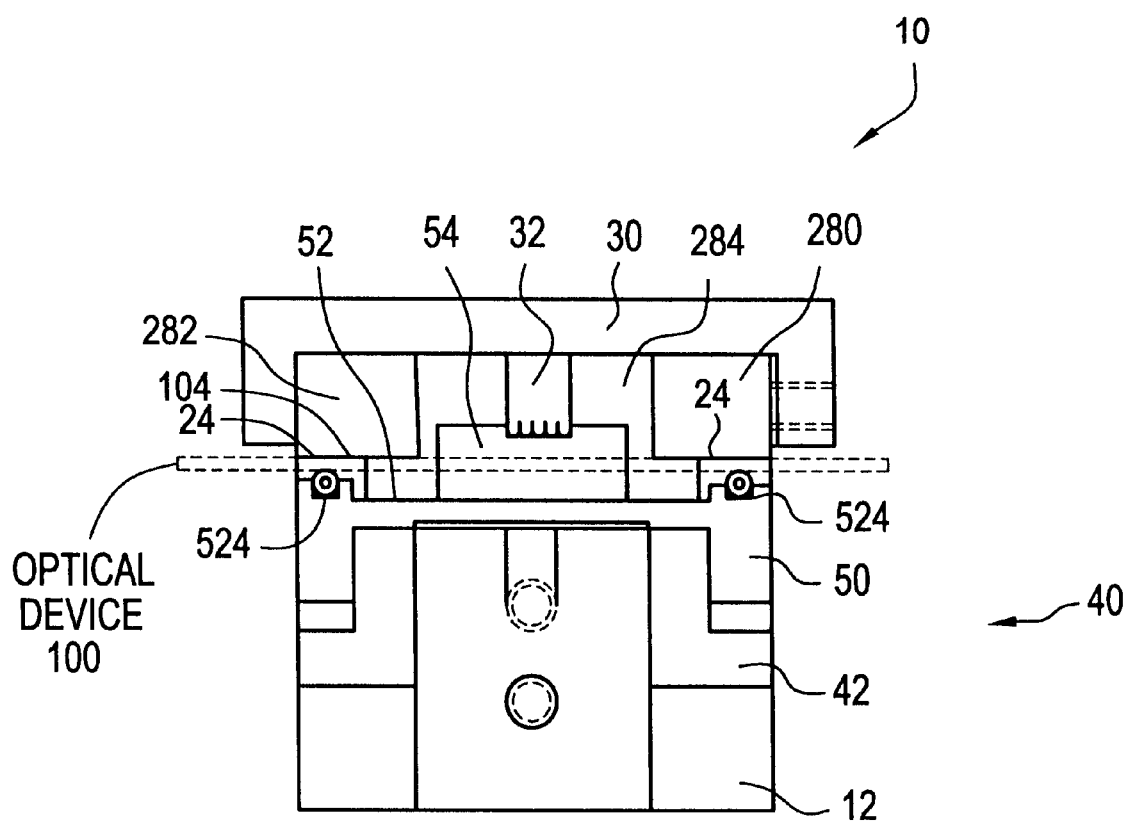
FIG. 2 is a rear elevation view of the automated chip holder of the present invention.

As embodied herein and depicted in FIG. 2, a rear elevation view of the automated chip holder 10 of the present invention includes a cantilevered member 28 that has arms 280 and 282 which form open area 284. Adjustable stop member 30 includes stop tab 32 which extends downward in the z-axis direction into open area 284. Adjustable platform 50 includes tongue member 54 which extends upward in the z-axis direction. Optical chip 100 is clamped against surface 24 by adjustable platform 50 as it moves upward along the z-axis, positioning registration surface 104 in z-axis alignment. Resilient pad 524 supports optical chip 100 during clamping and provides uniform clamping forces in a z-direction. Resilient pad 524 compensates for surface irregularities in the adjustable platform which would otherwise generate an uneven pressure distribution. Note that tongue member 54 and stop tab 32 interlock preventing movement of adjustable platform 50 in certain circumstances.

Figure 3:
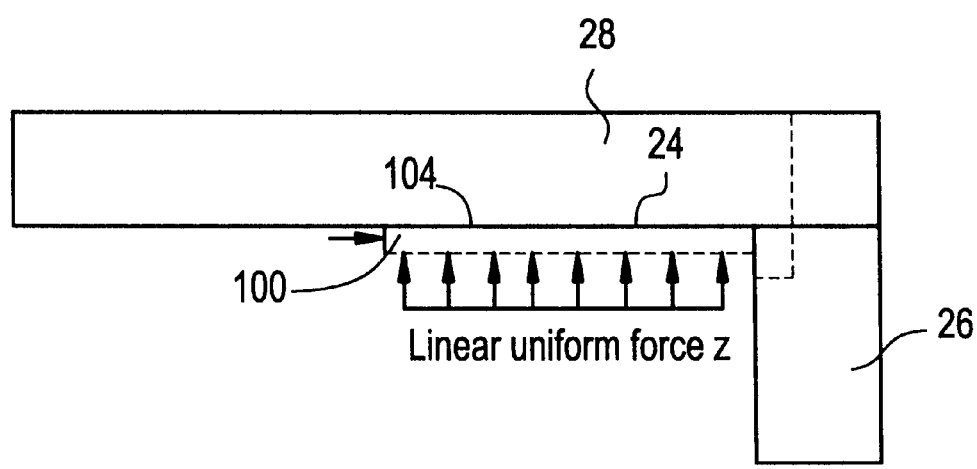
FIG. 3 is a detail view illustrating the uniform force applied in the z-direction during alignment.

As embodied herein and depicted in FIG. 3, the uniform clamping forces applied by resilient pad 524 are approximately equal to 100 grams/mm. The term "uniform force" means that the amplitude of the linear force applied by resilient pad 524 is equal at every point of contact between resilient pad 524 and optical chip 100.

Figure 4:
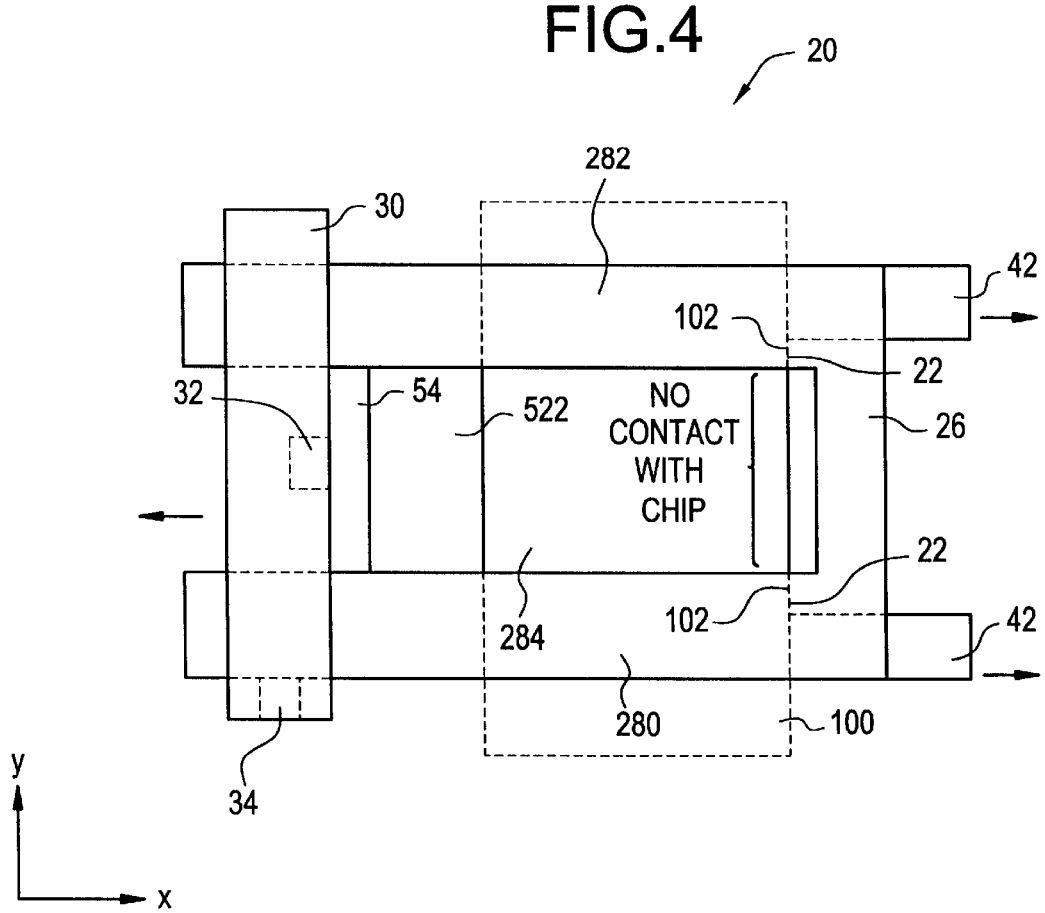
FIG. 4 is a detail view of a registration member of the present invention.

FIG. 4 is a detail view of registration member 20 of the present invention in a plane formed by the x-axis and the y-axis. Arms 280 and 282 of cantilevered member 28 are connected to column member 26 to form a u-shape having open area 284. Adjustable stop member 30 is disposed on arms 280 and 282 and adjustable along the x-axis to accomodate optical chips of any size. The position of adjustable stop member 30 is fixed for a particular size optical device by set device 34. Set device 34 may be of any suitable well-known type, but there is shown by way of example, a set screw which is pressed against arm 280. FIG. 4 also depicts stop tab 32 interlocking with tongue member 54. In x-axis alignment, registration edge 102 is resiliently pressed against column surface 22 by resilient wedge 522 as transport member 42 advances in the x-axis direction. Column surface 22 is the x-axis reference. In order to reduce the frictional force between optical chip 100 and x-axis reference 22 and to ensure the accuracy of the reference, notch 220 is formed in column member 26. Thus, the point of contact between optical chip 100 and x-axis reference 22 is reduced to small region.

Figure 5:
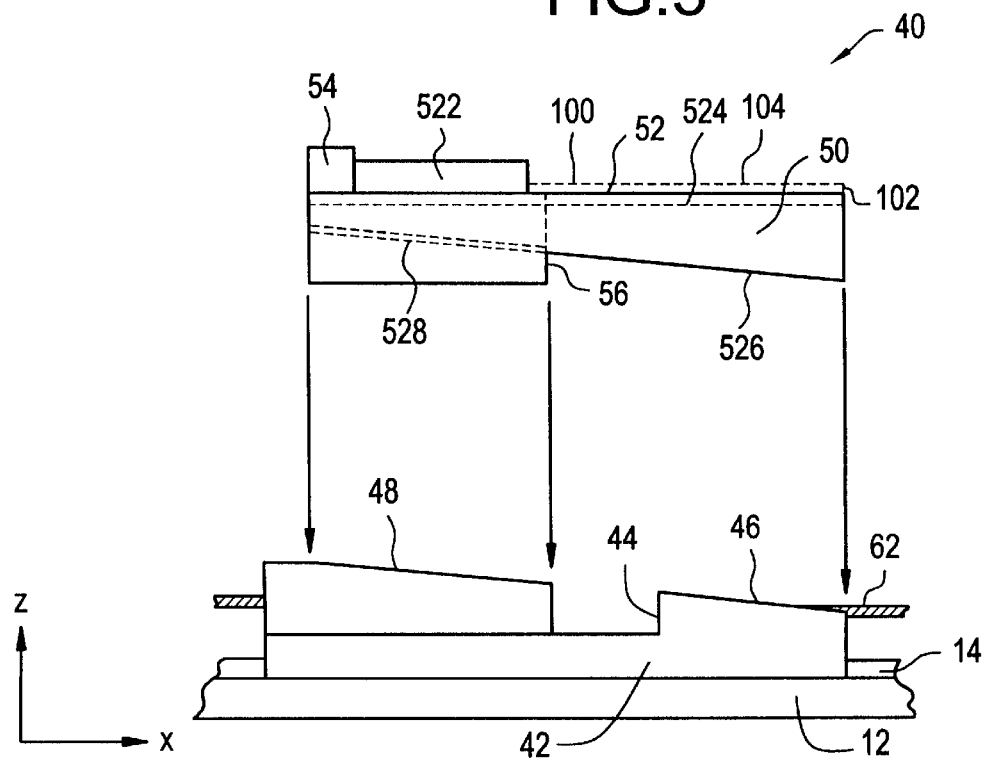
FIG. 5 is a detail view of a side elevation of an adjustable chuck assembly of the present invention.

FIG. 5 is a detail view of a side elevation of an adjustable chuck assembly of the present invention. In accordance with the invention, the adjustable chuck assembly 40 may further include transport member 42 and adjustable platform 50. Transport member 42 is disposed on support base 12 and connected to the rotating screw 62. It is driven along the x-axis in either direction by the rotation of rotating screw 62. Transport member 42 includes transport inclined surfaces 46 and 48 for supporting the adjustable platform 50. Inclined surfaces 46 and 48 are finely polished and coated with teflon to lower the coefficient of friction. Transport stop edge 44 is provided to limit the movement of adjustable platform 50.

Also depicted in FIG. 5, adjustable platform 50 is disposed on transport member 42. Adjustable platform 50 is removable and is not attached to transport member 42 by any kind of connector or adhesive. It maintains its position on transport member 42 by gravity and frictional force only, allowing it to freely slide on polished inclined surfaces 46 and 48. Adjustable platform 50 includes stage member 52, tongue member 54, and platform stop edge 56. Stage member 52 is equipped with resilient wedge 522 which, as described above, provides uniform clamping forces in the x-direction during clamping and alignment. Optical chip 100 is disposed on resilient pad 524. Stage inclined surfaces 526 and 528 are also provided, corresponding to transport inclined surfaces 46 and 48. Inclined surfaces 526 and 528 are also polished and coated with teflon. The position of optical chip 100 along the z-axis is adjusted by sliding inclined surfaces 526 and 528 over inclined surfaces 46 and 48. As discussed above, tongue member 54 prevents the adjustable platform 50 from moving along the x-axis when the tongue member 54 is interlocked with the stop tab 32 of the adjustable stop member 30. Platform stop edge 56 interlocks with transport stop edge 44 to prevent adjustable platform 50 from completely sliding off transport member 42.

Figure 6:
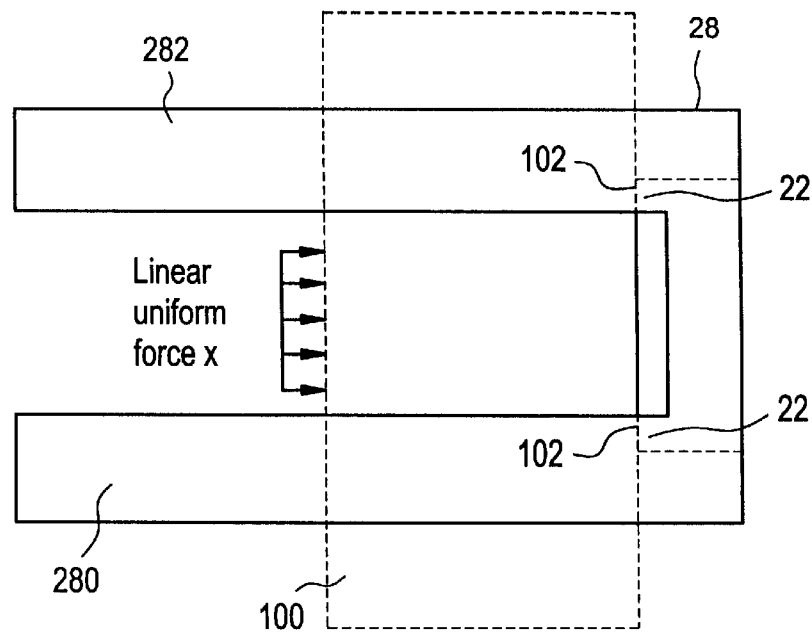
FIG. 6 is a detail view illustrating the uniform force applied in the x-direction during alignment.

As embodied herein and depicted in FIG. 6, the uniform clamping forces applied by resilient wedge 522 are approximately equal to 40 grams/mm. The ratio between the z-direction force and the x-direction force is approximately 5:2. However, the x-direction force can be as little as 10 grams/mm. Again, the term "uniform force" means that the amplitude of the linear force applied by resilient wedge 522 is equal at every point of contact between resilient wedge 522 and optical chip 100. Resilient wedge 522 compensates for any surface irregularities on platform 52 that would might otherwise generate an uneven pressure distribution on optical chip 100.

Figure 7:
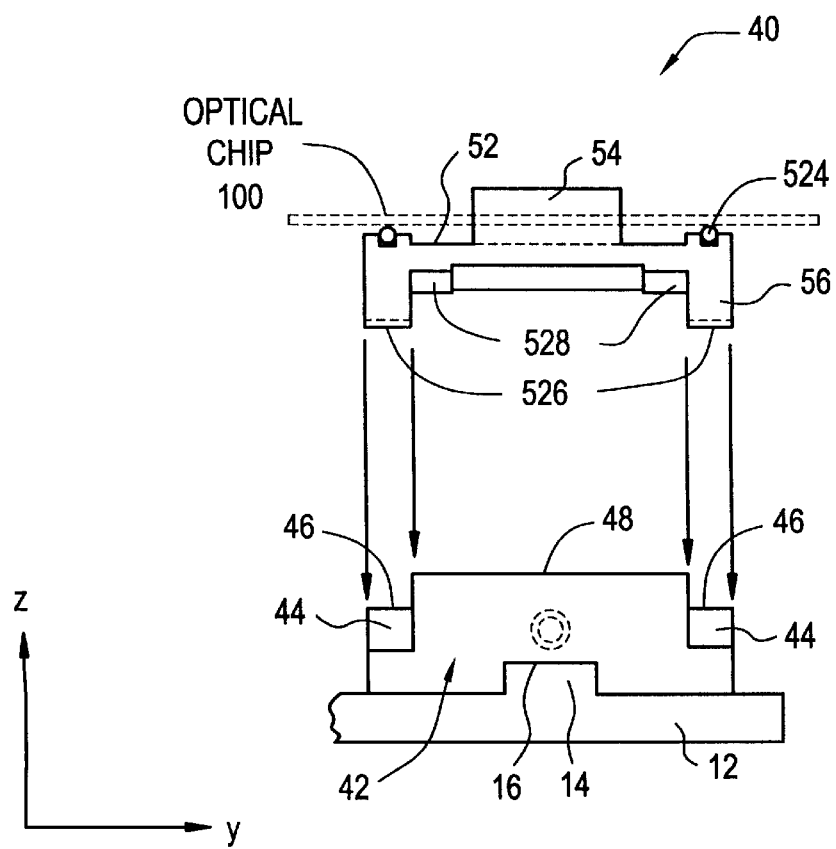
FIG. 7 is a detail view of a rear elevation of the adjustable chuck assembly of the present invention.

FIG. 7 is a detail view of a rear elevation of adjustable chuck assembly 40 of the present invention. Transport member 42 has track guide 16 formed in the bottom surface. Track guide 16 mates with slide track 14 of support base 12. Stop edge member 56 fits over transport member 42 such that inclined surfaces 526 and 528 rest on inclined surfaces 46 and 48. This design eliminates movement of chuck assembly 40 along the y-axis. Optical chip 100 is disposed on resilient pad 524. As depicted, resilient pad 524 is inserted in a groove formed along the edge of stage member 52 and provides the uniform clamping force in the z-direction as discussed above. In one embodiment, the position of optical chip 100 on stage member 52 is predetermined and fixed before adjustable platform 50 is disposed on transport member 42 to thereby establish y-axis alignment. Subsequently, optical chip 100 and adjustable platform 50 are lowered onto transport member 42 as a unit. In another embodiment, adjustable platform 50 is disposed on transport member 42 before loading the optical chip 100. In this embodiment, a vacuum chuck carries optical chip 100 to adjustable platform 50 and disposes optical chip 100 on adjustable platform 50 at a predetermined position. Thus, in either embodiment, optical chip 100 is automatically aligned with respect to the y-axis when loaded into automated holder 10.

Figure 8:
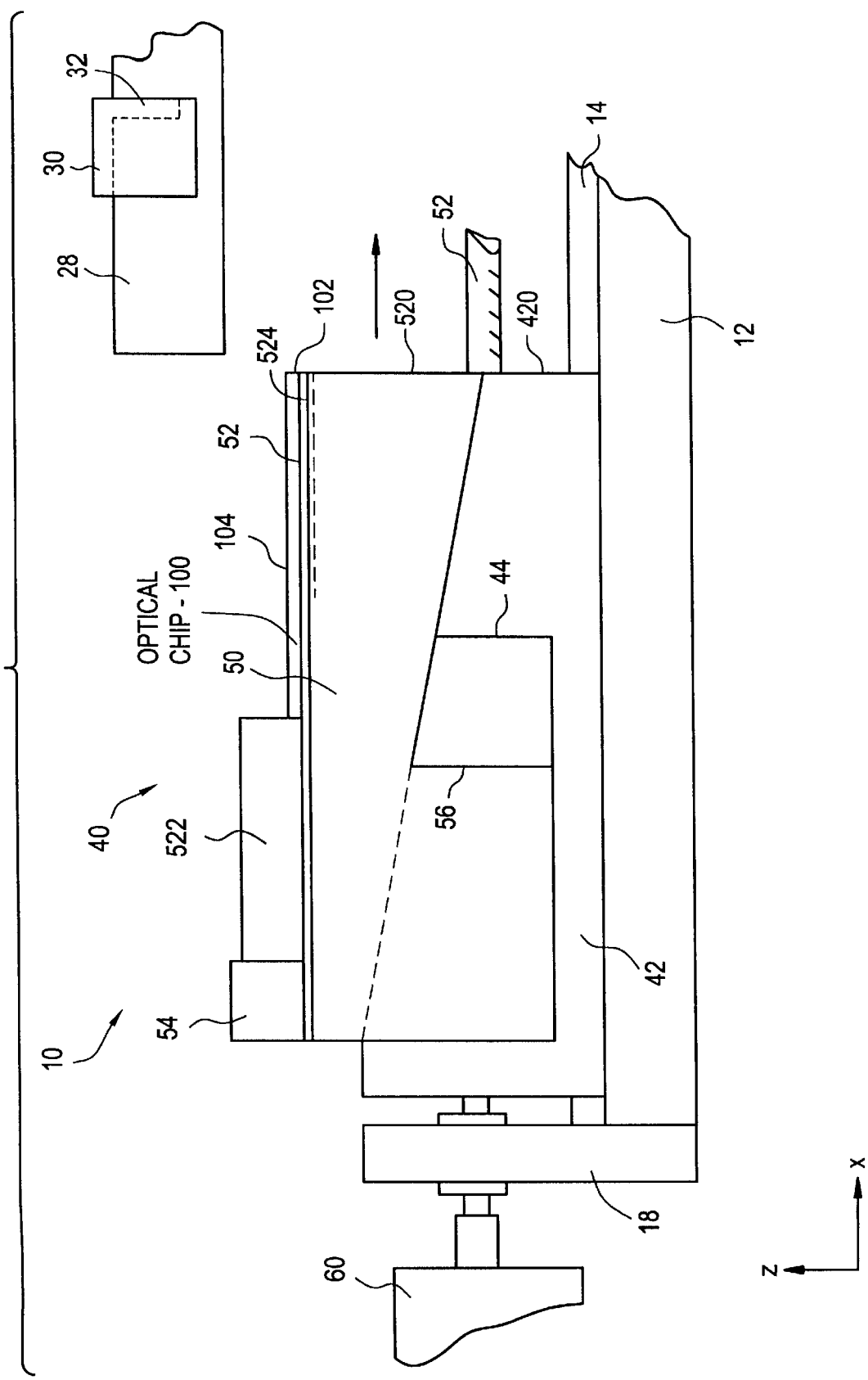
FIG. 8 is a detail view of the device interchange position of the automated chip holder of the present invention.

The operation of automated chip holder 10 will now be explained in reference to FIGS. 8 and 9. FIG. 8 is a detail view of chuck assembly 40 in the device interchange position of automated chip holder 10 of the present invention. Adjustable chuck assembly 40 is disposed on support base 12 at a position on the x-axis adjacent to end wall 18 of support base 12. It is in this position that optical chip 100 is loaded and the pigtailed optical chip is unloaded from the automated chip holder 10. As discussed above, y-axis alignment is acheived during the loading process. Registration edge 102 is aligned with stage edge 520 by properly selecting the size of resilient wedge 522. Stage edge 520 is aligned with transport member edge 420 to provide the necessary x-axis clearance between adjustable platform 50 and cantilevered member 28. Once loading is complete, adjustable platform 50 can be slid forward on transport member 42 until platform stop edge 56 contacts transport stop edge 44. This would increase the z-axis clearance between registration surface 104 and surface 24, the z-axis alignment reference. There must be enough clearance to allow tongue member 54 to pass under stop tab 32 of adjustable stop member 30 when the transport member 42 advances toward the alignment position in the x-axis direction.

Figure 9:
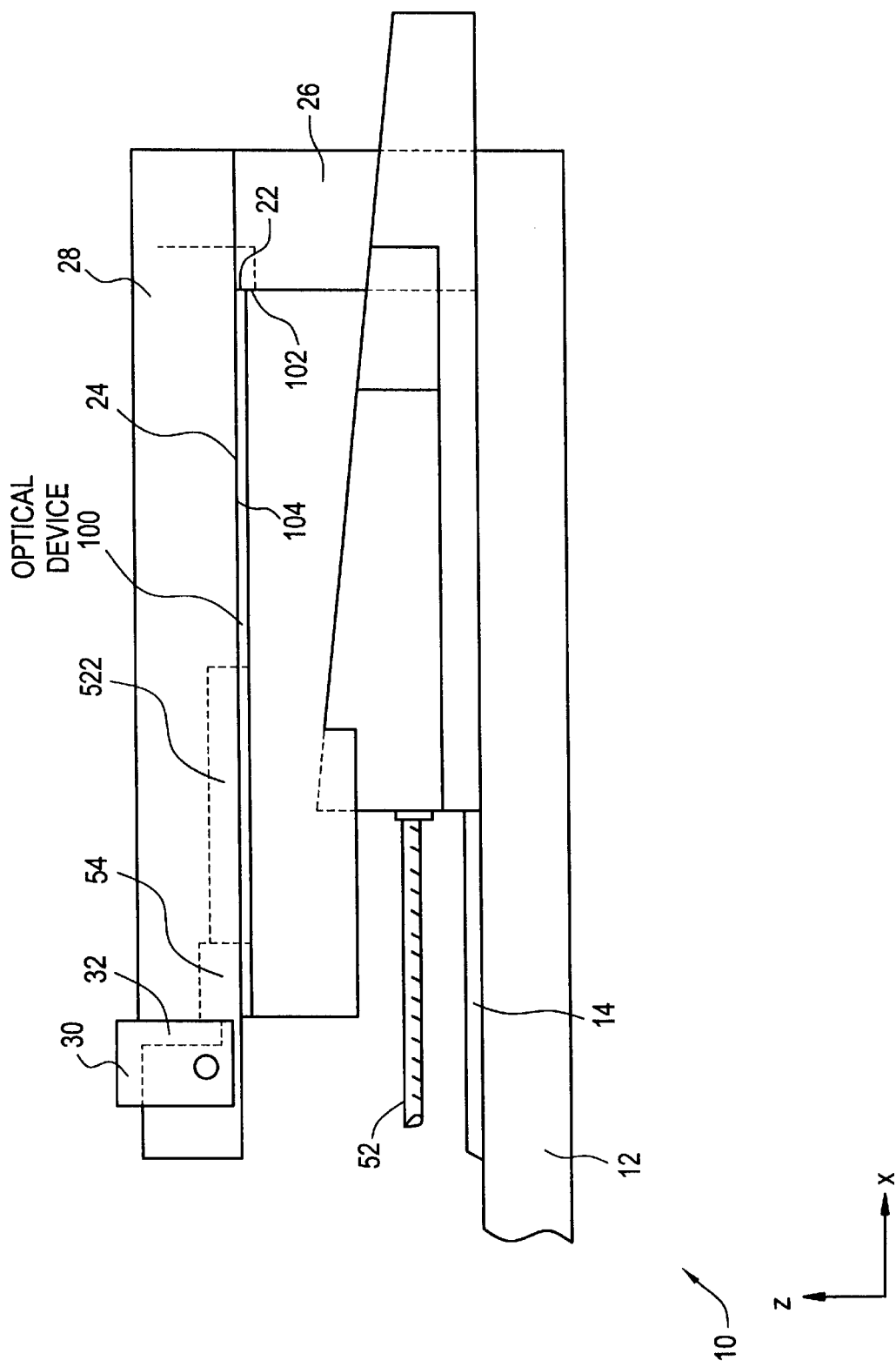
FIG. 9 is a detail view of an alignment position of the automated chip holder of the present invention.

FIG. 9 is a detail view of an alignment position of the automated chip holder of the present invention. Based on the size and thickness of optical chip 100, stepper motor 60, under the control of PLC 64 (both not shown), drives transport member 42 from the device interchange position to the x-axis alignment position. Once transport member 42 reaches this position on the x-axis, registration edge 102 is pressed against x-axis alignment reference 22, and the movement of adjustable platform 50 in the x-axis ceases. At this moment, the x-axis uniform force is exerted on the opposite edge of optical chip 100 by resilient wedge 522. Since adjustable platform 50 can no longer move in the x-axis, inclined surfaces 46 and 48 slide under inclined surfaces 526 and 528, forcing adjustable platform 50 to slide up the z-axis toward the z-axis alignment reference, surface 24. Subsequently, tongue member 54 interlocks with stop tab 32 and registration surface 104 is clamped against surface 24. When optical chip 100 is resiliently clamped, stepper motor 60 is de-energized and rotatable screw 62 stops turning. The uniform forces that are exerted on optical chip 100 by resilient wedge 522 and resilient pad 528 are maintained by rotatable screw 62 which is fixed in position until the pigtailing process is complete.

After pigtailing is completed, the pigtailed optical chip is moved back to the device interchange position shown in FIG. 8. Stepper motor 60 is re-energized and begins to turn rotatable screw 62 in a reverse direction causing transport member 42 to retract along the x-axis. As transport member 42 moves in a reverse direction along the x-axis, tongue member 54 is pressed against stop tab 32 preventing adjustable platform 50 from moving along the x-axis. Inclined surfaces 46 and 48 slide under inclined surfaces 526 and 528 and adjustable platform 50 moves in the z-direction toward support base 12. Once tongue member 54 is disengaged from stop tab 32, adjustable chuck assembly 40 moves as a unit in a reverse x-axis direction toward the device interchange position. Once there, the pigtailed chip is interchanged for an unprocessed chip, and the above described process will be repeated.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An automated chip holder for positioning an optical chip in a pigtailing system, said optical chip having a registration edge and a registration surface, wherein said automated chip holder positions said optical chip in a three dimensional space characterized by a rectangular coordinate system having an x-axis, y-axis, and z-axis, said automated chip holder comprising:
    a support base having a slide track disposed parallel to the x-axis;
    a registration member fixed relative to the support base for defining an alignment position in the three dimensional space;
    an adjustable chuck assembly slidably disposed on said slide track for moving the optical chip between a device interchange position and said alignment position, said adjustable chuck assembly being movable in the x-axis direction and adjustable in the z-axis direction in response to a force directed in the x-axis direction; and
    a drive unit connected to said adjustable chuck assembly for applying the x-axis force to said adjustable chuck assembly;
    wherein said registration member further comprises:
        an x-axis alignment reference for aligning the optical chip in an x-axis direction by aligning the registration edge to said x-axis reference;
        a z-axis alignment reference for aligning the optical chip in an z-axis direction by aligning the registration surface to said z-axis reference;
        a column member fixed to the support base and extending in a direction parallel to the z-axis, wherein the x-axis alignment reference is at least one surface of said column member;
        a cantilevered member fixed to said column member and extending in a direction parallel to the support base, wherein the z-axis alignment reference is a surface region of the cantilevered member; and
        an adjustable stop member movably connected to said cantilevered member, wherein the z-axis alignment reference is disposed between said adjustable stop member and said column member.

2. The automated chip holder in accordance with claim 1, wherein the adjustable chuck assembly effects alignment by aligning the registration edge with the x-axis alignment reference and the registration surface with the z-axis alignment reference.

3. The automated chip holder in accordance with claim 2, wherein the adjustable stop member includes a stop tab for preventing the adjustable chuck assembly from moving in the x-axis direction while in the alignment position.

4. The automated chip holder in accordance with claim 1, wherein the adjustable chuck assembly further comprises:
    a transport member disposed on the slide track and operatively connected to the drive unit and movable in the x-axis direction in response to the x-axis force; and
    an adjustable platform for holding the optical chip, said adjustable platform being disposed on said transport member and adjustable in the z-axis direction in response to a movement of said transport member in the x-axis direction, wherein said adjustable platform and the optical chip are loaded and unloaded from the adjustable chuck assembly as a unit, at the device interchange position.

5. The automated chip holder in accordance with claim 4, wherein the transport member further comprises:
    a first inclined surface for supporting the adjustable platform;
    a drive screw for moving the transport member in said x-axis direction; and
    a first edge which is aligned to the adjustable platform in the device interchange position.

6. The automated chip holder in accordance with claim 5, wherein the adjustable platform further comprises:
    a stage member having a stage surface for holding the optical chip, an alignment edge and a second inclined surface corresponding to the first inclined surface, wherein said alignment edge is aligned to the first leading edge in the device interchange position; and
    a tongue member connected to said stage member for interlocking with the adjustable stop member when in the alignment position.

7. The automated chip holder in accordance with claim 6, wherein a movement by the transport member in the x-axis direction toward the alignment position presses the registration edge against the x-axis alignment reference causing the second inclined surface to slide over the first inclined surface and thereby move the registration surface in the z-axis direction toward the z-axis alignment reference.

8. The automated chip holder in accordance with claim 6, wherein a movement by the transport member in the x-axis direction toward the device interchange position forces the tongue member against the adjustable stop member causing the second inclined surface to slide over the first inclined surface and thereby move the stage member in a z-axis direction toward the support base until the tongue member is disengaged from the adjustable stop member.

9. The automated chip holder in accordance with claim 6, wherein the stage member further comprises:
    a resilient wedge disposed on the stage surface between the tongue member and the optical chip, wherein said resilient wedge presses the registration edge against the x-axis alignment reference with a uniform force; and
    an resilient pad disposed on the stage surface for resiliently supporting the optical chip, wherein said resilient pad presses the registration surface against z-axis alignment reference with a uniform force.

10. The automated chip holder in accordance with claim 9, wherein the resilient wedge is selected to accomodate a size and a shape of the optical chip.

11. The automated chip holder in accordance with claim 4, wherein a y-axis alignment is effected when the adjustable platform and the optical chip are loaded into the adjustable chuck assembly by disposing the adjustable platform on the transport member.

12. The automated chip holder in accordance with claim 1, wherein the adjustable chuck assembly further includes:

a resilient wedge for pressing the registration edge against the registration member with a uniform force directed in the x-axis direction; and an resilient pad for pressing the registration surface against the registration member with a uniform force directed in the z-axis direction.

13. A method for automatically positioning an optical chip in a pigtailing system having an automated chip holder, said optical chip includes a registration edge and a registration surface, said automated chip holder includes a support base having a slide track, a registration member fixed to the support base for defining an alignment position of said optical chip in a three dimensional space characterized by a rectangular coordinate system having an x-axis, y-axis, and z-axis, said method for automatically positioning said optical chip comprising the steps of:

providing an adjustable chuck assembly slidably disposed on said slide track for moving the optical chip between a device interchange position and the alignment position, said adjustable chuck assembly being movable in the x-axis direction and adjustable in the z-axis direction in response to an x-axis force;

applying said x-axis force to thereby move the optical chip from a device interchange position to the alignment position; and connecting pigtail optical fibers to the optical chip;

wherein the step of providing an adjustable chuck assembly further includes the steps of:

providing a transport member disposed on the slide track and operatively connected to the drive unit and movable in the x-axis direction in response to the x-axis force; and providing an adjustable platform for holding the optical chip, said adjustable platform being disposed on said transport member and adjustable in the z-axis direction in response to a movement of said transport member in the x-axis direction, wherein said adjustable platform and the optical chip are loaded and unloaded from the adjustable chuck assembly as a unit, at the device interchange position wherein the registration member further comprises a column member having an x-axis alignment reference, a cantilevered member fixed to said column member and having a z-axis alignment reference, and an adjustable stop member connected to said cantilevered member for interlocking with the adjustable platform during alignment.

14. The method according to claim 13, wherein the step of applying the x-axis force further comprises the steps of:

pressing the registration edge against the x-axis alignment reference to effect an x-axis alignment, wherein said step of pressing causes the adjustable platform to slide over the transport member and move in a z-axis direction toward z-axis alignment reference; and pressing the registration surface against the z-axis alignment reference to effect a z-axis alignment, wherein the alignment position is effected when both said x-axis alignment and said z-axis alignment are effected.

15. The method according to claim 13, further comprising the step of moving a pigtailed optical device from the alignment position to the device interchange position.

16. The method according to claim 15, wherein the step of moving a pigtailed optical device from the alignment position to the device interchange position further comprises the steps of:

pressing the adjustable platform against the adjustable stop member to thereby cause the adjustable platform to slide over the transport member and move in a z-axis direction toward the support base until the adjustable platform is disengaged from the adjustable stop member; and moving the transport member and the adjustable platform together in the x-axis direction toward the device interchange position.

17. The method according to claim 16, further comprising the steps of:

unloading a pigtailed optical chip by lifting the adjustable platform off the transport member at the device interchange position; and loading a second optical chip by disposing the adjustable platform on the transport member while in the device interchange position.

* * * * *